(12) United States Patent
Ichikawa et al.

(10) Patent No.: US 8,257,186 B2
(45) Date of Patent: Sep. 4, 2012

(54) SLIDING-TYPE TRIPOD-SHAPED CONSTANT-VELOCITY UNIVERSAL JOINT

(75) Inventors: Kazuyuki Ichikawa, Okazaki (JP); Hiromasa Kinoshita, Kawasaki (JP)

(73) Assignee: JTEKT Corporation, Osaka-shi (JP)

( * ) Notice: Subject to any disclaimer, the term of this patent is extended or adjusted under 35 U.S.C. 154(b) by 232 days.

(21) Appl. No.: 12/669,580

(22) PCT Filed: Jul. 7, 2008

(86) PCT No.: PCT/JP2008/062275
§ 371 (c)(1),
(2), (4) Date: Apr. 28, 2010

(87) PCT Pub. No.: WO2009/011243
PCT Pub. Date: Jan. 22, 2009

(65) Prior Publication Data
US 2010/0248847 A1 Sep. 30, 2010

(30) Foreign Application Priority Data
Jul. 17, 2007 (JP) .................................. 2007-185822

(51) Int. Cl.
*F16D 3/205* (2006.01)
(52) U.S. Cl. ........................................ 464/111; 464/905
(58) Field of Classification Search ................. 464/111, 464/123, 124, 905; 403/124–126
See application file for complete search history.

(56) References Cited

U.S. PATENT DOCUMENTS

| 5,167,583 A | 12/1992 | Bensinger et al. |
| 5,391,013 A * | 2/1995 | Ricks et al. ............... 464/111 X |
| 5,411,440 A | 5/1995 | Bensinger et al. |
| 6,602,142 B2 * | 8/2003 | Tone et al. ................... 464/111 |
| 2010/0022315 A1 | 1/2010 | Ando et al. |

FOREIGN PATENT DOCUMENTS

| DE | 26 20 527 B1 * | 1/1977 | ................... 464/111 |
| IT | 522936 * | 3/1958 | ................... 464/111 |
| JP | 49 90747 | 8/1974 | |
| JP | 3 172619 | 7/1991 | |
| JP | 2003 74581 | 3/2003 | |
| JP | 2007 10028 | 1/2007 | |

* cited by examiner

*Primary Examiner* — Gregory Binda
(74) *Attorney, Agent, or Firm* — Oblon, Spivak, McClelland, Maier & Neustadt, L.L.P.

(57) ABSTRACT

A sliding-type tripod-shaped constant-velocity universal joint capable of being downsized while reducing induced thrust force. The constant-velocity universal joint includes: an outer race; a tripod including a boss portion and three tripod-shaft portions being inserted into roller grooves; and rollers. And, a shaft-axis-wise width of the tripod-shaft portions is formed smaller as it goes from the root side to the leading-end side in a torque transmission region of the tripod-shaft portions. Further, a torque-transmission-wise width of the tripod-shaft portions is formed greater as it goes from the root side to the leading-end side in the torque transmission region when defining a direction that intersects with the shaft axis and the tripod-shaft portions orthogonally as a torque transmission direction.

6 Claims, 4 Drawing Sheets

SLIDING-TYPE TRIPOD-SHAPED CONSTANT-VELOCITY UNIVERSAL JOINT

TECHNICAL FIELD

The present invention is one which relates to a sliding-type tripod-shaped constant-velocity universal joint.

BACKGROUND ART

Conventional tripod-shaft portions are formed as a columnar shape. In this a tripod-shaped constant-velocity universal joint, when transmitting rotary force in the case where the joint angle is not 0 degree, the rollers move reciprocally along the roller grooves of the outer race while the rollers rotate around the axis of the tripod-shaft portions and move reciprocally in the axial direction. On this occasion, since the tripod-shaft portions have a columnar shape, the rollers are always positioned on an identical axis with respect to the tripod-shaft portions. Accordingly, slippage occurs between the rollers and the roller grooves; as a result, induced thrust force occurs in the joint-axis direction. The resulting induced thrust force becomes the occurrence cause of vehicle-body vibrations and noises, and have an influence on the noise, vibration, and harshness (NVH) performance of vehicle.

Hence, in order to reduce the induced thrust force, a sliding-type tripod-shaped constant-velocity universal joint is available, sliding-type tripod-shaped constant-velocity universal joint which is disclosed in Japanese Unexamined Patent Publication (KOKAI) Gazette No. 3-172,619, for instance. In this sliding-type tripod-shaped constant-velocity universal joint, the tripod-shaft portions' outer-peripheral-surface configuration is formed as a spherical-surface shape. By means of this, the rollers become rotatable with respect to the tripod-shaft portions, and thereby it is adapted so that no slippage occurs between the rollers and the roller grooves.

DISCLOSURE OF THE INVENTION

Assignment to be Solved by the Invention

Here, in the sliding-type tripod-shaped constant-velocity universal joint that is disclosed in Japanese Unexamined Patent Publication (KOKAI) Gazette No. 3-172,619, since the tripod-shaft portions' root portion is formed as a constricted configuration, the root's section modulus becomes smaller. Accordingly, in order to secure strength for the tripod-shaft portions, it is needed to jumboize the tripod-shaft portions' cross-sectional configuration. Consequently, the sliding-type tripod-shaped constant-velocity universal joint's contour jumboizes.

The present invention is one which has been done in view of such circumstances, and it is an object to provide a sliding-type tripod-shaped constant-velocity universal joint which is capable of being downsized while reducing induced thrust force.

Means for Solving the Assignment

Hence, the present inventors studied earnestly in order to solve this assignment; as a result of their repeated trial and error, they thought of the following for reducing induced thrust force: the needed swing angle of rollers with respect to tripod-shaft portions differs depending on the relative position of the rollers with respect to the tripod-shaft portions; and then they arrived at completing the present invention.

First of all, the needed swing angle of rollers with respect to tripod-shaft portions will be explained, needed swing angle which is for reducing induced thrust force. In the case where the joint angle is 0 degree, the relative position of the rollers with respect to the tripod-shaft portions is always constant. The position of the rollers in this case is, of the torque transmission region of the tripod-shaft portions, present on the root side.

Here, the torque transmission region refers to an axial-wise region of the tripod-shaft portions in which, of the outer peripheral surface of the tripod-shaped portions, parts that contribute to torque transmission are included. Parts that contribute to torque transmission refer to parts which, of the tripod-shaft portions, are able to contact the rollers when torque transmission is carried out between the tripod-shaft portions and the rollers.

On the other hand, in the case where the joint angle is not 0 degree, the rollers reciprocate with respect to the tripod-shaft portions in the tripod-axial direction. And, in the case where the rollers are positioned, of the tripod-shaped portions, on the root side, it is favorable for reducing induced thrust force that the rollers' roller rotation axis can coincide with the tripod-shaft portions' tripod axis. The rollers' position with respect to the tripod-shaft portions in this instance coincides with the rollers' position with respect to the tripod-shaft portions in the case where the joint angle is 0 degree.

Moreover, in the case where the joint angle is not 0 degree, but in the case where the rollers are positioned, of the tripod-shaft portions, on the leading-end side, it is favorable for reducing induced thrust force that the rollers can be in an inclined state with respect to the tripod-shaft portions. It is favorable that the more the rollers go, of the tripod-shaped portions, to the leading-end side the greater this inclination angle can become.

That is, it is favorable to make the rollers' roller rotation axis coincide with the tripod-shaft portions' tripod axis in the case where the rollers are positioned, of the tripod-shaft portions, on the root side; and to make the rollers' inclination angle with respect to the tripod-shaft portions greater as the rollers go, of the tripod-shaft portions, more toward the leading-end side.

Hereinafter, an inclination angle of the tripod-shaft portions with respect to the roller rotation axis when being viewed from the torque transmission direction will be referred to as a pitching angle. Then, it is favorable that the more adjacent the rollers' position is to the leading-end side of the tripod-shaft portions the greater a permissible pitching angle can be. For example, the following are available: the pitching angle is not permitted (i.e., 0 degree) when the rollers are positioned on the tripod-shaft portions' root side; the pitching angle is permitted up to 30 degrees when the rollers are positioned on the tripod-shaft portions' leading-end side, and the like.

Moreover, it is favorable that the tripod-shaft portions' inclination angle when being viewed from the shaft axis direction (hereinafter being referred to as a "rolling angle" as well) can rather be permitted, even though somewhat. Because the rolling angle is permitted, it is possible to reduce induced thrust force that results from the eccentricity of tripod.

In view of above, a sliding-type tripod-shaped constant-velocity universal joint according to the present invention is adapted as follows.

Specifically, a sliding-type tripod-shaped constant-velocity universal joint is equipped with:

an outer race being formed as a cylindrical shape whose inner peripheral surface is provided with three roller grooves that extend in an axial direction thereof;

a tripod being equipped with a boss portion to be connected to a shaft, and three tripod-shaft portions being disposed upright so as to extend from an outer peripheral surface of the boss portion outward in a diametric direction of the boss portion respectively and being inserted into each of the roller grooves; and rollers being formed as an annular shape, being supported to the tripod-shaft portions rotatably with respect to the tripod-shaft portions, and additionally being inserted into the roller grooves rollably by fitting;

and is characterized in that:

a shaft-axis-wise width of the tripod-shaft portions is formed smaller as it goes from the root side to the leading-end side in a torque transmission region of the tripod-shaft portions; and a torque-transmission-wise width of the tripod-shaft portions is formed greater as it goes from the root side to the leading-end side in the torque transmission region when defining a direction that intersects with the shaft axis and the tripod-shaft portions orthogonally as a torque transmission direction.

Note that cylindrical shapes are included in the "annular shape."

In accordance with the sliding-type tripod-shaped constant-velocity universal joint according to the present invention, a shaft-axis-wise width of the tripod-shaft portions is formed smaller as it goes from the root side to the leading-end side in the torque transmission direction. Here, an inside diameter of the rollers is a shaft-axis-wise width or more at the root of the tripod-shaft portions at least. If such is the case, a clearance is formed between the rollers and the tripod-shaft portions at the leading end of the tripod-shaft portions when being viewed in the torque transmission direction. Therefore, it is possible for the rollers to swing on the leading-end side of the tripod-shaft portions when being viewed in the torque transmission direction. Further, it is possible to make the pitching angle greater as the rollers go from the root side of the tripod-shaft portions to the leading-end side. By means of this, it is possible to change the pitching angle so as to reduce induced thrust force.

And, in the torque transmission region, a torque-transmission-wise width of the tripod-shaft portions is formed greater as it goes from the root side to the leading-end side. Here, an inside diameter of the rollers is a maximum torque-transmission-wise width or more of the tripod-shaft portions that are present within the rollers. That is, an inside diameter of the rollers is a width or more of the shaft-axis-wise width at the root of the tripod-shaft portions and the maximum torque-transmission-wise width of the tripod-shaft portions that are present within the rollers, shaft-axis-wise width and maximum torque-transmission-wise width whichever is greater.

By means of this, a clearance is formed between the tripod-shaft portions and the rollers even when being viewed from the shaft-axis direction. Therefore, the rollers come to be swingable even when being viewed from a shaft-transmission direction. That is, it is possible to reduce induced thrust force.

Further, in accordance with the sliding-type tripod-shaped constant-velocity universal joint, the shaft-axis-wise width of the tripod-shaft portions is formed smaller as it goes toward the leading-end side. That is, this means that it is possible to make the shaft-axis-wise width at the root of the tripod-shaft portions greater.

On the other hand, the torque-transmission-wise width of the tripod-shaft portions is formed greater as it goes toward the leading-end side. That is, the torque-transmission-wise width at the root of the tripod-shaft portions is small compared with that at the leading end. However, it is allowable in the present invention that the torque-transmission-wise width can become greater as it goes toward the leading-end side, and thereby it is possible to make the torque-transmission-wise width at the root the diameter "R" or more at the root (namely, constricted section) of the tripod-shaft portions that are set forth in Japanese Unexamined Patent Publication (KOKAI) Gazette No. 3-172,619, for instance.

By means of these, in the sliding-type tripod-shaped constant-velocity universal joint according to the present invention, it is possible to form the tripod-shaft portions, for example, in the following manner: an axially-orthogonal cross-sectional configuration at the tripod-shaped portions' root is adapted into an elliptical shape; its minor axis (or the torque-transmission-wise width) is equal to the aforementioned diameter "R"; and its major axis (or the shaft-axis-wise width) is equal to the rollers' inside diameter. In accordance with this setting, a section modulus at the root of the tripod-shaft portions according to the present invention becomes greater than a section modulus at the constricted section according to Japanese Unexamined Patent Publication (KOKAI) Gazette No. 3-172,619. As a result, it is possible to downsize a contour of sliding-type tripod-shaped constant-velocity universal joint, because it is possible to enhance the tripod-shaft portions' strength.

Note that, in the aforementioned example, it is possible to adapt an axially-orthogonal cross-sectional configuration at the root of the tripod-shaped portions into such an elliptical shape as well whose major axis makes the torque-transmission-wise width (namely, being greater than the diameter "R" and being smaller than the rollers' inside diameter), and whose minor axis makes the shaft-axis-wise width (namely, the diameter "R"). Moreover, it is possible to adapt into such a circle as well which comprises a diameter that is greater than the diameter "R" and smaller than the rollers' inside diameter. In both of the aforementioned settings, a section modulus at the root of the tripod-shaft portions becomes greater. In accordance with the sliding-type tripod-shaped constant-velocity universal joint according to the present invention, it is possible to reduce induced thrust force without ever forming any constricted configuration, and thereby improvement of the tripod-shaft portions' strength becomes feasible.

Here, in the sliding-type tripod-shaped constant-velocity universal joint according to the present invention, it is preferable that a difference "d1" between the torque-transmission-wise width on the leading-end side of the tripod-shaft portions and that on the root side of the tripod-shaft portions can be smaller than a difference "d2" between the shaft-axis-wise width on the leading-end side of the tripod-shaft portions and that on the root side of the tripod-shaft portions (i.e., "d1"<"d2").

When making the value of the difference "d1" smaller, an allowable rolling angle becomes smaller. Meanwhile, when making the value of the difference "d1" smaller, it is possible to make the torque-transmission-wise width at the root of the tripod-shaft portions greater by that extent. Here, the rolling angle that is necessary for the reduction of induced thrust force can be just a little, and is far smaller than the pitching angle. That is, by means of setting so as to be "d1"<"d2," it is possible to make a section modulus at the root of the tripod-shaft portions much greater in addition to making it possible to reduce induced thrust force. By means of this, it becomes feasible to downsize the contour of sliding-type tripod-shaped constant-velocity universal joint furthermore.

Here, in the sliding-type tripod-shaped constant-velocity universal joint according to the present invention, it is preferable that the maximum width of the torque-transmission-wise width of the tripod-shaft portions can be greater than an inside diameter of the rollers. In this case, the assembly of the tripod-shaft portions with the rollers is carried out by means of press fitting. In the present invention, the torque-transmission-wise width of the tripod-shaft portions becomes maximum at the foremost leading end of the tripod-shaft portions. This leading end is positioned more outward than is the rollers' inner periphery by means of press fitting.

In this way, it is possible to prevent the rollers from getting out of the tripod-shaft portions. For example, at the time of assembly process and even at the time of transfer, the rollers are prevented from falling off. In this way, it is possible to improve the workability of assembly operations, and the like.

Here, in the sliding-type tripod-shaped constant-velocity universal joint according to the present invention, it is preferable that the tripod-shaft portions can have an outer-periphery configuration, which makes a curve (namely, a protruded arc shape, for instance) that swells outward with respect to the axial center of the tripod-shaft portions, in the torque transmission region that is viewed from the shaft axis direction. Meanwhile, it is also allowable that the aforesaid outer-periphery configuration can make a straight line.

In the case where the outer-periphery configuration makes a curve that swells outward with respect to the axial center of the tripod-shaft portions, it is possible to make each of the respective section moduli in the torque transmission region greater, compared with the case where the aforesaid outer-periphery configuration makes a straight line, by such an extent that swells more outward than that straight line. That is, it is possible to enhance the tripod-shaft portions' strength, and accordingly much further downsizing becomes feasible. Furthermore, by means of the setting that the aforesaid outer-periphery configuration makes a curve that swells outward with respect to the axial center of the tripod-shaft portions, it is possible to provide the rolling angle more smoothly. Moreover, it is possible to alleviate chattering at the time of torque transmission. On the contrary, in the case where the aforesaid outer-periphery configuration makes a straight line, it is likely to be processed, and consequently it is possible to improve productivity.

Moreover, in the sliding-type tripod-shaped constant-velocity universal joint according to the present invention, it is preferable that the tripod-shaft portions can have an outer-periphery configuration, which makes a curve that swells outward with respect to the axial center of said tripod-shaft portions, in the torque transmission region that is viewed from the torque transmission direction. In this way, it is possible to make the respective section moduli in the torque transmission region greater in the same manner as aforementioned. That is, it is possible to enhance the tripod-shaft portions' strength, and accordingly much further downsizing becomes feasible. However, in a case where the aforesaid outer-periphery configuration makes a straight line, it is likely to be processed, and consequently it is possible to improve productivity.

EFFECT OF THE INVENTION

In accordance with the sliding-type tripod-shaped constant-velocity universal joint according to the present invention, downsizing becomes feasible while reducing induced thrust force.

EXPLANATION ON REFERENCE NUMERALS

1: Constant-velocity Universal Joint;
10: Outer Race; 11: Roller Grooves;
20: Tripod; 21: Boss Portion; 21a: Inner-periphery Spline
22: Tripod-shaft Portions;
30: Rollers; 31: Outer Roller; 31a, 31b: Stopper-ring Grooves;
32: Inner Roller; 33: Needle Rollers; 34, 35: Stopper Rings

BEST MODE FOR CARRYING OUT THE INVENTION

Next, the present invention will be explained in more detail while naming embodiment modes. Here, a sliding-type tripod-shaped constant-velocity universal joint 1 (hereinafter, being simply referred to as "a constant-velocity universal joint") will be explained while naming a case where it is used for connecting the power transmission shafts of vehicle as an example. For example, this is the case where it is used for the connector part between an axle portion, which is connected to a differential gear, and a shaft, such as a drive shaft.

Figure 1:
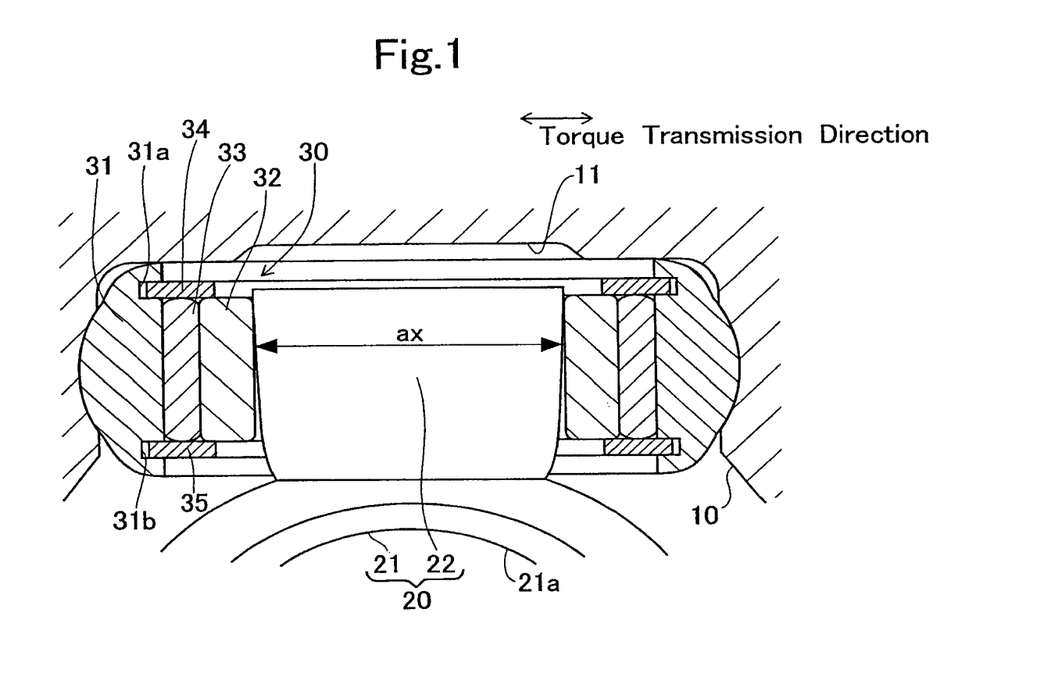
FIG. 1 is a cross-sectional diagram in which part of a constant-velocity universal joint 1 is cut in the diametric direction (i.e., a diameter-wise cross-sectional diagram)
Figure 2:
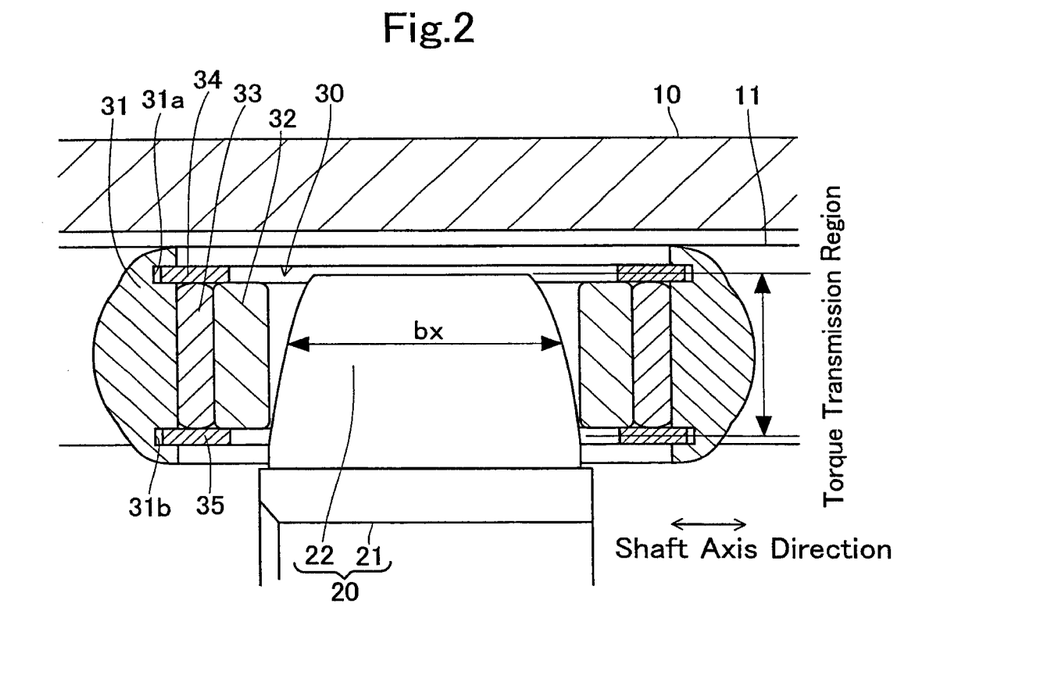
FIG. 2 is a cross-sectional diagram in which part of the constant-velocity universal joint 1 is cut in the axial direction (i.e., an axis-wise cross-sectional diagram)
Figure 3:
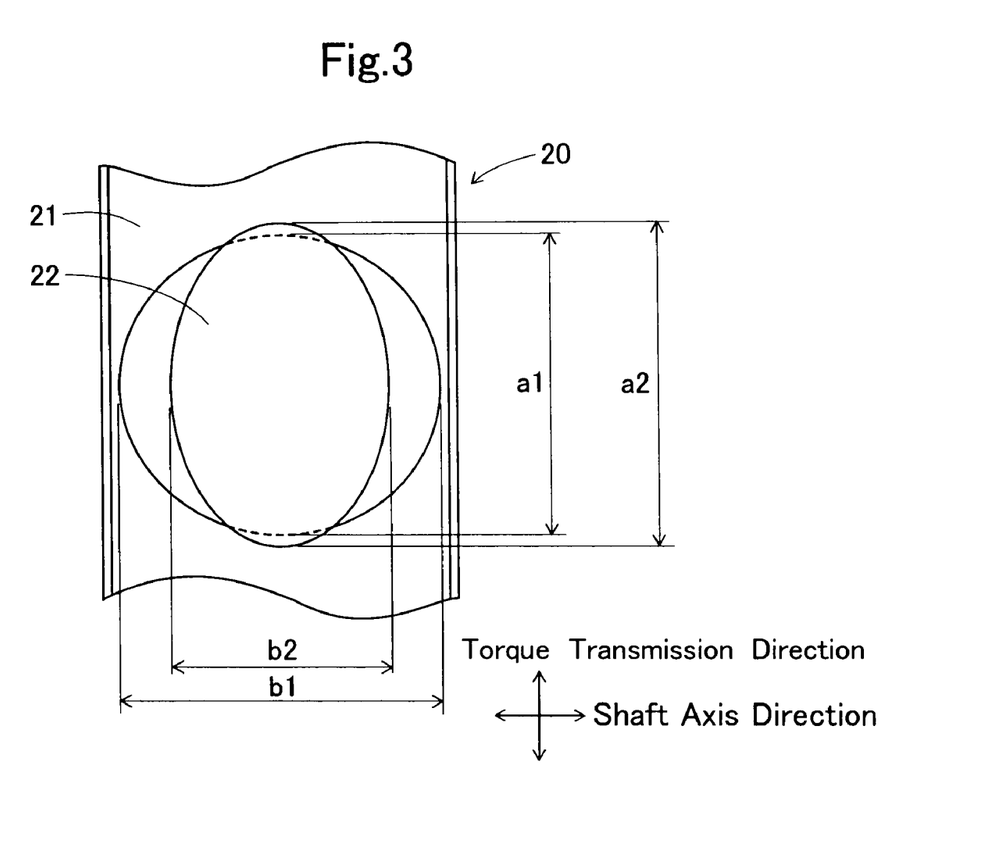
FIG. 3 is a schematic diagram in which a tripod 20 is viewed from the leading-end side of one of tripod-shaft portions 22.
Figure 4:
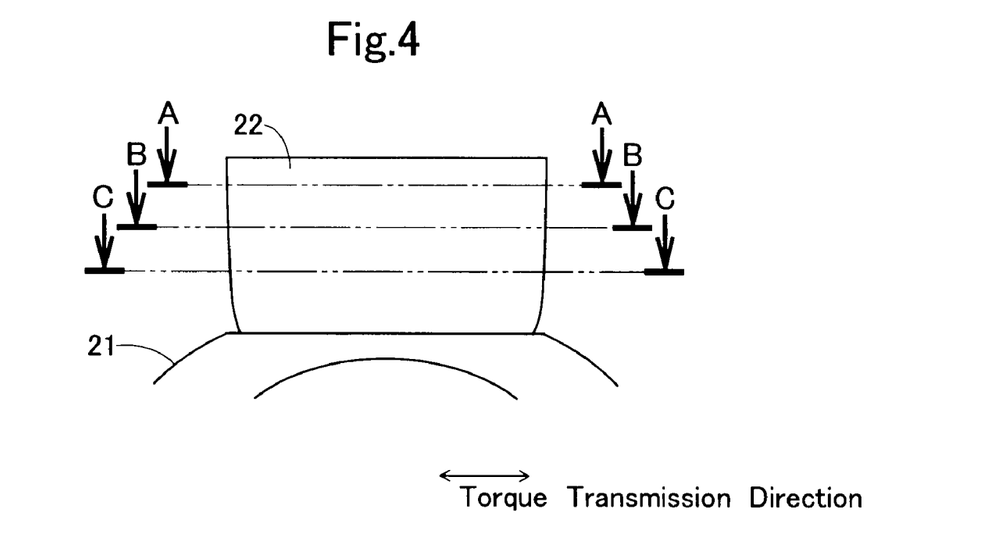
FIG. 4 is a diagram in which one of the tripod-shaft portions 22 is viewed from the shaft axis direction (i.e., the axial direction of a boss portion 21)
Figure 5:
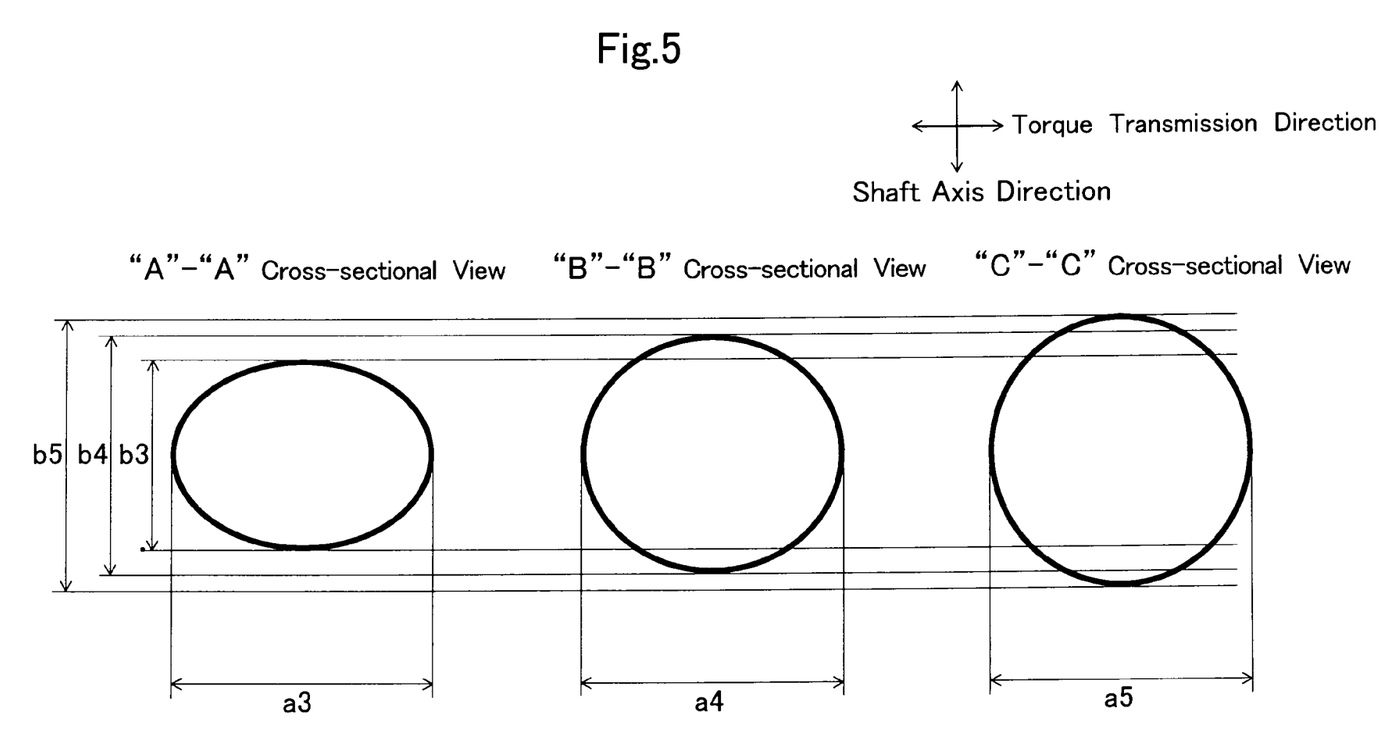
FIG. 5 is the respective cross-sectional diagrams of one of the tripod-shaft portions 22 in FIG. 4 (e.g., the "A"-"A" cross-sectional view, the "B"-"B" cross-sectional view, and the "C"-"C" cross-sectional view)

This constant-velocity universal joint 1 will be explained with reference to FIG. 1 through FIG. 5. FIG. 1 is a cross-sectional diagram in which part of the constant-velocity universal joint 1 is cut in the diametric direction (i.e., a diameter-wise cross-sectional diagram (hereinafter, being referred to as a shaft-axis-wise view as well)). FIG. 2 is a cross-sectional diagram in which part of the constant-velocity universal joint 1 is cut in the axial direction (i.e., an axis-wise cross-sectional diagram (hereinafter, being referred to as a torque-transmission-wise view as well)). FIG. 3 is a schematic diagram in which a tripod 20 is viewed from the leading-end side of one of tripod-shaft portions 22. Specifically, FIG. 3 is a schematic diagram in which the tripod 20 is viewed from the upper side of FIG. 2. FIG. 4 is a diagram in which one of the tripod-shaft portions 22 is viewed from the shaft-axis direction (i.e., the axial direction of a boss portion 21). FIG. 5 is the respective cross-sectional diagrams of one of the tripod-shaft portions 22 in FIG. 4 (e.g., the cross-sectional view, the "B"-"B" cross-sectional view, and the "C"-"C" cross-sectional view).

As illustrated in FIG. 1, this constant-velocity universal joint 1 is constituted of an outer race 10 to be connected to a differential gear (not shown), a tripod 20 to be connected to a shaft (not shown), and rollers 30 intervening between the outer race 10 and the tripod 20.

The outer race 10 is formed in a cylindrical shape (a bottomed cylindrical shape, for instance), and one of the opposite end sides is connected to a differential gear. And, in the inner peripheral surface of the cylindrical section of the outer race 10, a roller groove 11, which extends in the outer-race axial direction (i.e., the forward/rear direction in FIG. 1), is formed in a quantity of three at equal intervals in the circumferential direction of the outer-race axis. The opposite side surfaces of these roller grooves 11 are formed in an indented arc shape.

The tripod 20 is put in place inside the cylindrical section of the outer race 10. This tripod 20 is equipped with a boss portion 21, and three tripod-shaft portions 22. The boss portion 21 comprises a circular cylindrical shape, and an inner-periphery spline 21a is formed on the inner-peripheral side. This inner-periphery spline 21a is connected to an outer-periphery spline on one of the opposite ends of a drive shaft (not shown) by means of fitting.

The respective tripod-shaft portions 22 are installed upright so that they extend from an outer peripheral surface of the boss portion 21 outward in the diametric direction of the boss portion 21, respectively. These tripod-shaft portions 22 are formed at equal intervals (e.g., 120-deg. intervals) in the circumferential direction of the boss portion 21. And, the leading end of each of the tripod-shaft portions 22 is inserted into each of the roller grooves 11 of the outer race 10.

The tripod-shaft portions 22 comprise a columnar shape with an elliptical cross-sectional configuration (including circular cross-sectional configurations). To be specific, as illustrated in FIG. 1 and FIG. 3, a torque-transmission-wise width "ax" of the tripod-shaft portions 22 becomes greater slightly as it goes from the root side of the tripod-shaft portions 22 to the leading-end side in the torque transmission region. Specifically, a torque-transmission-wise width "a2" at the leading end of the tripod-shaft portions 22 is formed greater slightly than a torque-transmission-wise width "a1" at the root of the tripod-shaft portions 22. And, the torque-transmission-wise width "a1" becomes greater slightly than the inside diameter of a later-described inner roller 32 (e.g., by 10 μm approximately). That is, the assembly of the tripod-shaft portions 22 with the rollers 30 is carried out by means of press fitting.

Moreover, as shown in FIG. 2 and FIG. 3, a shaft-axis-wise width "bx" of the tripod-shaft portions 22 is formed smaller as it goes from the root side of the tripod-shaft portions 22 to the leading-end side in the torque transmission region. Specifically, a shaft-axis-wise width "b2" at the leading end of the tripod-shaft portions 22 is formed smaller than a shaft-axis-wise width "b1" at the root of the tripod-shaft portions 22. And, a difference (namely, "d1"="a2"−"a1") between the torque-transmission-wise width at the leading end of the tripod-shaft portions 22 and that at the root becomes smaller than a difference (namely, "d2"="b2"−"b1") between the shaft-axis-wise width at the leading end of the tripod-shaft portions 22 and that at the root (i.e., "d1"<"d2").

Moreover, in the present embodiment mode, the shaft-axis-wise width "b1" becomes somewhat greater compared with the torque-transmission-wise width "a1" (i.e., "a1"<"b1"). That is, as illustrated in FIG. 3, an axially-orthogonal cross-sectional configuration at the root of the tripod-shaft portions 22 becomes an elliptical shape that has a minor axis (a1) and a major axis (b1). However, it is allowable that the aforesaid configuration can be ellipses with "a1">"b1," or circles with "a1"="b1."

Note that the "torque transmission region" is the region shown in FIG. 2, namely, it is an axis-wise region of the tripod-shaft portions 22 in which, of the outer peripheral surface of the tripod-shaped portions 22, parts that contribute to torque transmission are included. The "parts that contribute to torque transmission" are parts of the tripod-shaft portions 22, parts which are capable of contacting with the inner roller 32 of the rollers 30 when torque transmission is carried out between the tripod-shaft portions 22 and the rollers 30. These parts that contribute to torque transmission are present on the right-end and left-end sides of the tripod-shaft portions 22 in FIG. 1.

The configuration of the tripod-shaft portions 22 will be described in more detail with reference to FIG. 4 and FIG. 5. Note that, in FIG. 4, the interval between the line "A"-"A" and the line "B"-"B," and the interval between the line "B"-"B" and the line "C"-"C" are equal to each other. As illustrated in FIG. 5, the torque-transmission-wise width in the "A"-"A" cross-sectional diagram is labeled "a3," and the shaft-axis-wise width in the "A"-"A" cross-sectional diagram is labeled "b3"; the torque-transmission-wise width in the "B"-"B" cross-sectional diagram is labeled "a4," and the shaft-axis-wise width in the "B"-"B" cross-sectional diagram is labeled "b4"; and the torque-transmission-wise width in the "C"-"C" cross-sectional diagram is labeled "a5," and the shaft-axis-wise width in the "C"-"C" cross-sectional diagram is labeled "b5."

As shown in FIG. 5, the magnitude relationship between the respective widths become as follows: "a1"<"a5"<"a4"<"a3"<"a2"; and "b1">"b5">"b4">"b3">"b2." Further, a difference between "a3" and "a4," namely, ("a3"−"a4"), differs somewhat from a difference between "a4" and "a5," namely, ("a4"−"a5"), that is, the latter is somewhat greater than the former. Moreover, a difference between "b3" and "b4," namely, ("b3"−"b4"), differs from a difference between "b4" and "b5," namely, ("b4"−"b5"), that is, the former is greater than the latter. That is, the variation of the torque-transmission-wise width "ax" in the axial direction and the variation of the shaft-axis-wise width "bx" in the axial direction do not become constant (or a linear function).

And, as illustrated in FIG. 1, an outer-periphery configuration of the tripod-shaft portions 22 in the torque transmission region that is viewed from the shaft-axis direction comprises a gentle curve, namely, it makes a curve that swells outward with respect to the axial center of the tripod-shaft portions. Moreover, as shown in FIG. 2, an outer-periphery configuration of the tripod-shaft portions 22 in the torque transmission region that is viewed from the torque-transmission direction comprises a gentle curve, namely, it makes a curve that swells outward with respect to the axial center of the tripod-shaft portions. These configurations enlarge the section modulus of the tripod-shaft portions 22, and thereby contribute to improving the strength of the tripod-shaft portions 22.

As an overall configuration, the rollers 30 comprise an annular shape. The rollers 30 are supported pivotally on an outer-periphery side of the tripod-shaft portions 22 so that they are able to rotate around the tripod shafts and are able to slide in the direction of the tripod shafts. Further, the rollers 30 are able to swing with respect to the tripod-shaft portions 22. Furthermore, the rollers 30 are inserted rollably into the roller grooves 11 by fitting. These rollers 30 are constituted of an outer roller 31, an inner roller 32, needle rollers 33, and stopper rings 34 and 35.

The outer roller 31 is formed as a cylindrical shape. An outer peripheral surface of this outer roller 31 comprises a configuration that corresponds to that of the roller grooves 11, namely, a configuration in which that of the roller grooves 11 is inverted. That is, an outer peripheral surface of the outer roller 31 is formed as a protruded arc shape. And, the outer roller 31 is inserted into each of the roller grooves 11 by fitting so that its axial center cross the elongation direction of the roller grooves 11 orthogonally. Moreover, an inner peripheral surface of the outer roller 31 is formed as a cylindrical shape, namely, in an identical diameter substantially over the axial direction of the outer roller 31. However, on both opposite opening sides of the inner peripheral surface of the outer roller 31, stopper-ring grooves 31a and 31b are formed over the entire circumference.

The inner roller 32 is formed as a cylindrical shape. An axis-wise length of the inner roller 31 is equivalent to a spaced distance between the stopper-ring grooves 31a and 31b that are formed in the outer roller 31. The axis-wise length of this inner roller 32 is slightly smaller than a length of the tripod-shaft portions 22 in the torque transmission region.

An outer peripheral surface of the inner roller 32 is formed as a cylindrical shape, namely, in an identical diameter over the entire axial direction of the inner roller 32. An outside diameter of this inner roller 32 is formed in an outside diameter that is smaller than an inside diameter of the outer roller 31. And, the inner roller 32 is put in place so as to be separated away from the outer roller 31 inwardly in the diametric direction thereof. In the resulting clearance between the inner roller 32 and the outer roller 31, a plurality of needle rollers 33 are put in place over the entire circumference. And, because of these intervening needle rollers 33, the inner roller 32 is made rotatable relatively with respect to the outer roller 31. Further, the inner roller 32 is put in place inwardly with respect to the outer roller 31 in the diametric direction, and coaxially therewith.

An inner peripheral surface of the inner roller 32 is formed as a cylindrical shape, namely, in an identical diameter over the entire axial direction of the inner roller 32. An inside diameter of this inner roller 32 becomes slightly greater than that of the major axis "b1" at the root of the tripod-shaft portions 22, and becomes slightly smaller than the torque-transmission-wise width "a2" at the leading end. And, the aforesaid leading end (at which the torque-transmission-wise width is "a2") of the tripod-shaft portions 22 is positioned on an outer side to the inner roller 32 (i.e., on an upper side in FIG. 1).

Here, the shaft-axis-wise width "bx" of the tripod-shaft portions 22 is formed smaller as it goes from the root side to the leading-end side. Therefore, in a case where the inner roller 32 is positioned at the root of the tripod-shaft portions 22, the roller 30 can hardly swing with respect to the tripod-shaft portions 22 in the torque-transmission-wise view (i.e., FIG. 2). On the contrary, in a case where the inner roller 32 is positioned at the leading end of the tripod-shaft portions 22, the roller 30 can swing greatly with respect to the tripod-shaft portions 22 in the torque-transmission-wise view (i.e., FIG. 2). That is, an allowable pitching angle becomes greater as the position of the inner roller 32 with respect to the tripod-shaft portions 22 goes from the root side to the leading-end side.

Meanwhile, the torque-transmission-wise width "ax" of the tripod-shaft portions 22 is formed greater slightly as it goes from the root side to the leading-end side. In this way, the roller 30 becomes swingable slightly with respect to the tripod-shaft portions 22 in the shaft-axis-wise view (i.e., FIG. 1). Note that, as aforementioned, since the difference "d1" between the torque-transmission-wise widths is smaller than the difference "d2" between the shaft-axis-wise widths (i.e., "d1"<"d2"), the rolling angle becomes smaller than the pitching angle. That is, a necessary rolling angle is allowed.

The stopper rings 34 and 35 comprise a letter-"C"-formed shape that is provided with a slit section. That is, the stopper rings 34 and 35 comprise a diametrically-reducible configuration. These stopper rings 34 and 35 are fitted into the stopper-ring grooves 31a and 31b of the outer roller 31, respectively. And, the stopper rings 34 and 35 are made so that they engage with respect to the inner roller 32 and needle rollers 33 in the axially-central direction of the rollers 30. That is, the stopper rings 34 and 35 inhibit the inner roller 20 and needle rollers 32 from moving relatively with respect to the outer roller 31 in the axial direction.

Note that, in the aforementioned setting, although the inner roller 32 of the rollers 30 is adapted into being a cylindrical shape, it is also allowable that the inner peripheral surface or outer peripheral surface of the inner roller 32 can comprise a spherical shape; or it is even allowable that it can be one which has a dent or bulge in the axially orthogonal direction of the rollers 30 (i.e., on the diametrically outer side or diametrically inner side). Moreover, in the aforementioned setting, although even the outer roller 31 of the rollers 30 is adapted into being a cylindrical shape, it is also allowable that the outer peripheral surface or inner peripheral surface of the outer roller 31 can comprise a spherical shape; or it is even allowable that it can be one which has a dent or bulge in the axially orthogonal direction of the rollers 30 (i.e., on the diametrically outer side or diametrically inner side).

Next, operations of the above-described tripod-shaped constant-velocity universal joint will be explained. First of all, when the joint angle is 0 degree, specifically, in a case where the axis of the shaft coincides with the axis of the outer race 10, the rollers 30 are positioned on the root side of the tripod-shaft portions 22. On this occasion, in order that the rollers 30 roll smoothly along the roller grooves 11, it is preferable that the roller rotation axis of the rollers 30 can coincide with the tripod axis of the tripod-shaft portions 22. When the rollers 30 are positioned on the root side of the tripod-shaft portions 22, the rollers 30 hardly swing with respect to the tripod-shaft portions 22, and accordingly the rotation axis of the rollers 30 and the axis of the tripod-shaft portions 22 are turned into such a state that they coincide with each other virtually. Therefore, in the case where the joint angle is 0 degree, the rollers 30 can roll smoothly along the roller grooves 11.

On the other hand, when the joint angle is not 0 degree, specifically, in a case where the axis of the shaft and the axis of the outer race 10 are inclined, the rollers 30 reciprocate between the root of the tripod-shaft portions 22 and the leading end. And, in the case where the joint angle is not 0 degree, in order that the rollers 30 roll smoothly along the roller grooves 11 when the rollers 30 are positioned at the root of the tripod-shaft portions 22, it is preferable that the rotation axis of the rollers 30 can coincide with the axis of the tripod-shaft portions 22. And, when the rollers 30 are positioned at the root of the tripod-shaft portions 22, the rollers 30 hardly swing with respect to the tripod-shaft portions 22, and accordingly the roller rotation axis of the rollers 30 and the tripod axis of the tripod-shaft portions 22 are turned into such a state that they coincide with each other virtually.

Moreover, in the case where the joint angle is not 0 degree, in order that the rollers 30 roll smoothly along the roller grooves 11 when the rollers 30 are positioned at the leading end of the tripod-shaft portions 22, it is preferable that the rollers 30 can be inclined with respect to the tripod-shaft portions 22 in the torque-transmission-wise view (i.e., FIG. 2). And, when the rollers 30 are positioned at the leading end of the tripod-shaft portions 22, the rollers 30 swing with respect to the tripod-shaft portions 22 so as to go along the roller grooves 11. This is because the rollers 30 are capable of swinging greatly with respect to the tripod-shaft portions 22 (specifically, an allowable pitching angle is great). Therefore, even in the case where the joint angle is not 0 degree, the rollers 30 can roll smoothly along the roller grooves 11.

In addition, against an eccentricity of the tripod 20, it is preferable that the rollers 30 can incline slightly with respect to the tripod-shaft portions 22 in the shaft-axis-wise view (i.e., FIG. 1). And, in the present embodying mode, the rollers 30 become swingable slightly, because a clearance, which allows a rolling angle, is disposed between the rollers 30 and the root side of the tripod-shaft portions 22 in the shaft-axis-wise view (i.e., FIG. 1). Therefore, even against an eccentricity of the tripod 20, the rollers 30 can roll smoothly along the roller grooves 11.

Furthermore, it is possible to provide the rolling angle more smoothly, and it is possible to alleviate chattering at the time of torque transmission, because the outer-periphery configuration of the tripod-shaft portions 22 in the torque transmission region is a curve that swells outward with respect to the axial center of the tripod-shaft portions in the shaft-axis-wise view (i.e., FIG. 1).

By means of above, the constant-velocity universal joint 1 is formed as such a configuration that allows a pitching angle and rolling angle which are necessary for the reduction of induced thrust force. That is, in accordance with the constant-velocity universal joint 1, it is possible to reduce induced thrust force. Further, it is possible to make the section modulus at the root of the tripod-shaped potions 22 greater compared with the one that possesses a constricted configuration at the root of the tripod-shaft portions as set forth in Patent Literature No. 1, because the root of the tripod-shaft portions 22 does not make any constricted configuration as shown in FIG. 1-FIG. 3. Moreover, the section modulus at the root of the tripod-shaft portions 22 becomes much greater, because the difference "d1" between the torque-transmission-wise widths is smaller than the difference "d2" between the shaft-axis-wise widths (i.e., "d1"<"d2"). As a result, downsizing the constant-velocity universal joint 1 becomes feasible, because it is possible to enhance the strength of the tripod-shaft portions 22.

Moreover, it is possible to prevent the rollers 30 from getting out of the tripod-shaft portions 22, because the maximum width (i.e., "a2") of the torque-transmission-wise width of the tripod-shaft portions 22 is greater than the inside diameter of the inner roller 32. For example, at the time of assembly process and even at the time of transfer, the rollers 30 are prevented from falling off. In this way, it is possible to improve the workability of assembly operations, and the like.

Note that the axially-orthogonal cross-sectional configuration at the root of the tripod-shaft portions 22 can be an ellipse in which "b1" makes the minor axis and "a1" makes the major axis (See FIG. 3). Moreover, it is also allowable that the aforesaid configuration can be a circle with "a1"="b1." Even in these cases, the settings effect same advantages as aforementioned.

Figure 6:
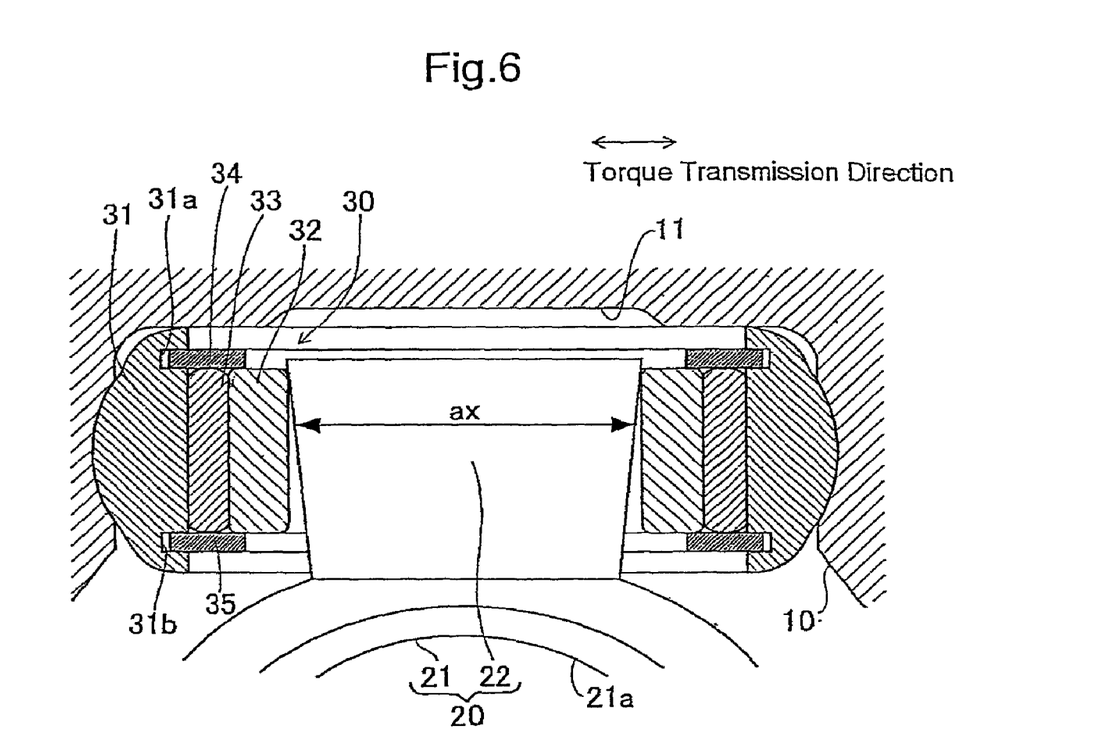
FIG. 6 is a cross-sectional diagram of straight line outer periphery configurations of one of the tripod-shaft portions 22.

In addition, as illustrated in FIG. 6, it is allowable that the outer-periphery configuration of the tripod-shaft portions 22 in the torque transmission region can even be a straight line in the shaft-axis-wise view (i.e., FIG. 1), or in the torque-transmission-wise view (i.e., FIG. 2). In this case, it becomes easy to process the tripod-shaft portions 22, and accordingly it is possible to improve the productivity thereof.

The invention claimed is:

1. A sliding-type tripod-shaped constant-velocity universal joint comprising:
   an outer race being formed as a cylindrical shape whose inner peripheral surface is provided with three roller grooves that extend in an axial direction thereof;
   a tripod being equipped with a boss portion to be connected to a shaft, and three tripod-shaft portions being disposed upright so as to extend from an outer peripheral surface of said boss portion outward in a diametric direction of said boss portion respectively and being inserted into each of said roller grooves; and
   rollers being formed as an annular shape, being supported to said tripod-shaft portions rotatably with respect to said tripod-shaft portions, and additionally being inserted into said roller grooves rollably by fitting;
   wherein a shaft-axis-wise width of said tripod-shaft portions is formed smaller as it goes from the root side to the leading-end side in a torque transmission region of said tripod-shaft portions; and
   a torque-transmission-wise width of said tripod-shaft portions is formed greater as it goes from the root side to the leading-end side in said torque transmission region when defining a direction that intersects with said shaft axis and said tripod-shaft portions orthogonally as a torque transmission direction.

2. The sliding-type tripod-shaped constant-velocity universal joint as set forth in claim 1, wherein a difference between said torque-transmission-wise width on the leading-end side of said tripod-shaft portions and that on the root side of the tripod-shaft portions is smaller than a difference between said shaft-axis-wise width on the leading-end side of said tripod-shaft portions and that on the root side of the tripod-shaft portions.

3. The sliding-type tripod-shaped constant-velocity universal joint as set forth in claim 1, wherein the maximum width of said torque-transmission-wise width of said tripod-shaft portions is greater than an inside diameter of said rollers.

4. The sliding-type tripod-shaped constant-velocity universal joint as set forth in claim 1, wherein said tripod-shaft portions have an outer-periphery configuration, which makes a curve that swells outward with respect to the axial center of said tripod-shaft portions, in said torque transmission region that is viewed from the shaft axis direction.

5. The sliding-type tripod-shaped constant-velocity universal joint as set forth in claim 1, wherein said tripod-shaft portions have an outer-periphery configuration, which makes a straight line, in said torque transmission region that is viewed from the shaft axis direction.

6. The sliding-type tripod-shaped constant-velocity universal joint as set forth in claim 1, wherein said tripod-shaft portions have an outer-periphery configuration, which makes a curve that swells outward with respect to the axial center of said tripod-shaft portions, in said torque transmission region that is viewed from the torque transmission direction.

* * * * *